(12) United States Patent
Koreeda

(10) Patent No.: US 6,956,686 B2
(45) Date of Patent: Oct. 18, 2005

(54) SCANNING OPTICAL SYSTEM

(75) Inventor: Daisuke Koreeda, Tokyo (JP)

(73) Assignee: PENTAX Corporation, Tokyo (JP)

( * ) Notice: Subject to any disclaimer, the term of this patent is extended or adjusted under 35 U.S.C. 154(b) by 648 days.

(21) Appl. No.: 10/142,149

(22) Filed: May 10, 2002

(65) Prior Publication Data

US 2003/0035046 A1 Feb. 20, 2003

(30) Foreign Application Priority Data

May 11, 2001 (JP) .................................. 2001-141404

(51) Int. Cl.[7] .............................................. G02B 26/08
(52) U.S. Cl. ...................... 359/207; 359/216; 359/206; 347/259
(58) Field of Search ................................ 359/204–207, 359/216–219; 347/243–244, 258–261

(56) References Cited

U.S. PATENT DOCUMENTS 6,437,897 B1 * 8/2002 Inagaki ....................... 359/205

6,466,350 B2 * 10/2002 Iizuka ........................ 359/207

FOREIGN PATENT DOCUMENTS

| JP | 7-120693 | 5/1995 |
| JP | 8-122673 | 5/1996 |
| JP | 11287966 | 10/1999 |

* cited by examiner

Primary Examiner—James Phan
(74) Attorney, Agent, or Firm—Greenblum & Bernstein, P.L.C.

(57) ABSTRACT

A scanning optical system includes a light source, an anamorphic optical element, a polygonal mirror, and an imaging optical system that converges the beam(s) on a surface to be scanned. The imaging optical system has a scanning lens, and a compensation lens provided on the surface side for compensating for curvature of field. All the surfaces of the scanning lens are rotationally symmetrical, and the compensation lens has an aspherical surface. A cross section of the aspherical surface in the auxiliary scanning direction is asymmetrical with respect to the optical axis thereof, and a SAG amount defining the aspherical surface is expressed by a two-dimensional polynomial.

12 Claims, 5 Drawing Sheets

SCANNING OPTICAL SYSTEM

BACKGROUND OF THE INVENTION

The present invention relates to a scanning optical system typically employed in a laser beam printer or the like.

In the scanning optical system for the laser beam printer, a laser beam emitted by a laser diode is deflected by a polygonal mirror to scan within a predetermined angular range. The scanning beam passes through an fθ lens, which converges the beam to form a scanning beam spot on a photoconductive surface of, for example, a photoconductive drum. As the polygonal mirror rotates, the beam spot moves on the photoconductive surface in a predetermined direction. By ON/OFF modulating the beam spot as the beam spot moves, and by rotating the photoconductive drum, a two-dimensional electrostatic latent image is formed on the photoconductive surface of the photoconductive drum. Hereinafter, the predetermined direction in which the beam spot moves as the polygonal mirror rotates is referred to as a main scanning direction, while a direction perpendicular to the main scanning direction, on the photoconductive surface, is referred to as an auxiliary scanning direction. It should be noted that by rotating the photoconductive drum, the photoconductive surface moves in the auxiliary scanning direction.

Further to the above, shape and direction of power of each optical element will be described hereinafter with reference to the directions on the photoconductive surface. Further, for the sake of explanation, a plane perpendicular to a rotation axis of the polygonal mirror and including an optical axis of the scanning lens is defined as a main scanning plane.

Sometimes, a multi-beam scanning optical system is configured such that a plurality of beams are deflected simultaneously by a single polygonal mirror. With such a configuration, since a single polygonal mirror is used as a deflector for each of the plurality of beams, the number of optical elements can be decreased, and a room for such elements can be reduced. If the plurality of the beams are respectively inclined in the auxiliary scanning direction, and are incident on substantially the same point on the polygonal mirror, the thickness of the polygonal mirror can be reduced, which reduces a manufacturing cost of the polygonal mirror.

However, if a beam is incident on the polygonal mirror as inclined in the auxiliary direction, a bow occurs, that is, a scanning line, which is defined as a locus of a beam on a surface to be scanned, curves. The bow deteriorates an imaging accuracy or quality, and should be suppressed particularly for a high-resolution scanning system.

SUMMARY OF THE INVENTION

One of the advantages provided by the present invention is to provide an optical system in which the bow on the surface to be scanned is well suppressed even when a beam incident on the polygonal mirror is inclined in the auxiliary scanning direction.

According to embodiments of the invention, there is provided a scanning optical system for emitting at least one beam scanning in a main scanning direction. The scanning optical system is provided with a light source that emits at least one beam, an anamorphic optical element that converges the at least one beam emitted by the light source in an auxiliary scanning direction which is perpendicular to the main scanning direction, a polygonal mirror that rotates and deflects the at least one beam emerged from the anamorphic optical element to scan in the main scanning direction, and an imaging optical system that converges the at least one beam deflected by the polygonal mirror to form at least one beam spot on a surface to be scanned, the at least one beam spot scanning in the main scanning direction on the surface to be scanned. The imaging optical system includes a scanning lens, and a compensation lens, provided on the surface side with respect to the scanning lens, to compensate for curvature of field. All the surfaces of the scanning lens are rotationally symmetrical, and the compensation lens has at least one aspherical surface. A cross section of the aspherical surface in the auxiliary scanning direction is asymmetrical with respect to the optical axis thereof, and a SAG amount defining the at least one aspherical surface is expressed by a two-dimensional polynomial.

By employing the aspherical surface defined by the two-dimensional polynomial, the power in the auxiliary scanning direction can be designed independently from the power distribution in the main scanning direction. Accordingly, even when the incident angle of each of the beams incident on the polygonal mirror has a certain value other than zero degrees, the bow can be well compensated for.

Further, the aspherical surface expressed by the two-dimensional polynomial can be designed to compensate for aberrations. Therefore, even if all the surfaces of the scanning lens are configured to be rotationally symmetrical surfaces, the bow can be compensated sufficiently. Thus, the manufacturing process of the scanning lens can be simplified, thereby reducing the manufacturing cost.

Optionally, the scanning lens consists of a first lens element and a second lens element. In one case, the first lens element may be a plastic lens and the second lens element may be a glass lens. Alternatively, both the first lens element and the second lens element can be plastic lenses.

In a particular case, the scanning lens may consist of a single lens element.

Preferably, the aspherical surface satisfies condition:

$$0 < \left| \frac{\Delta(dx/dz)}{\beta} \right| < 1.2 \times 10^{-2}$$

where, $\Delta(dx/dz)$ represents a difference between an inclination, in the auxiliary scanning direction, of the aspherical surface at a position where a chief ray of a beam that is incident on the surface to be scanned at a greatest image height in the main scanning direction, and an inclination, in the auxiliary scanning direction, of the spherical surface at another position where a chief ray of a beam that is incident on the surface to be scanned at the center of the scanning width, and denotes an incident angle of a beam onto a reflection surface of the polygonal mirror in the auxiliary scanning direction. The sign of $\beta$ is defined such that, if a sign of an inclination dx/dz is positive, the sign of the incident angle $\beta$ is positive, while if a sign of an inclination dx/dz is negative, the sign of the incident angle $\beta$ is also negative. The incident angle P will be described in detail later with reference to FIG. 8C.

According to another aspect, there is provided a laser beam printer employing a scanning optical system as described above.

That is, the scanning optical system employed in the laser beam printer may include a light source that emits at least one beam, an anamorphic optical element that converges the at least one beam emitted by the light source in an auxiliary scanning direction which is perpendicular to the main scanning direction, a polygonal mirror that rotates and deflects the at least one beam emerged from the anamorphic optical element to scan in the main scanning direction, and an imaging optical system that converges the at least one beam deflected by the polygonal mirror to form at least one beam spot on a surface to be scanned, the at least one beam spot scanning in the main scanning direction on the surface to be scanned. The imaging optical system includes a scanning lens, and a compensation lens, provided on the surface side with respect to the scanning lens, to compensate for curvature of field. All the surfaces of the scanning lens are rotationally symmetrical, and the compensation lens has at least one aspherical surface. A cross section of the aspherical surface in the auxiliary scanning direction is asymmetrical with respect to the optical axis thereof, and a SAG amount defining the at least one aspherical surface is expressed by a two-dimensional polynomial.

Optionally, the scanning lens may consist of a first lens element and a second lens element. In one case, the first lens element may be a plastic lens element and the second lens element may be a glass lens. Alternatively, both the first lens and the second lens element can be plastic lenses.

In a particular case, the scanning lens may consist of a single lens element.

Preferably, the aspherical surface satisfies condition:

$$0 < \left| \frac{\Delta(dx/dz)}{\beta} \right| < 1.2 \times 10^{-2}$$

where, $\Delta(dx/dz)$ represents a difference between an inclination, in the auxiliary scanning direction, of the aspherical surface at a position where a chief ray of a beam that is incident on the surface to be scanned at a greatest image height in the main scanning direction, and an inclination, in the auxiliary scanning direction, of the spherical surface at another position where a chief ray of a beam that is incident on the surface to be scanned at the center of the scanning width, and $\beta$ denotes an incident angle of a beam onto a reflection surface of the polygonal mirror in the auxiliary scanning direction.

DESCRIPTION OF THE EMBODIMENTS

Hereinafter embodiments according to the invention are described with reference to the accompanying drawings.

Figures 1A, 1B:
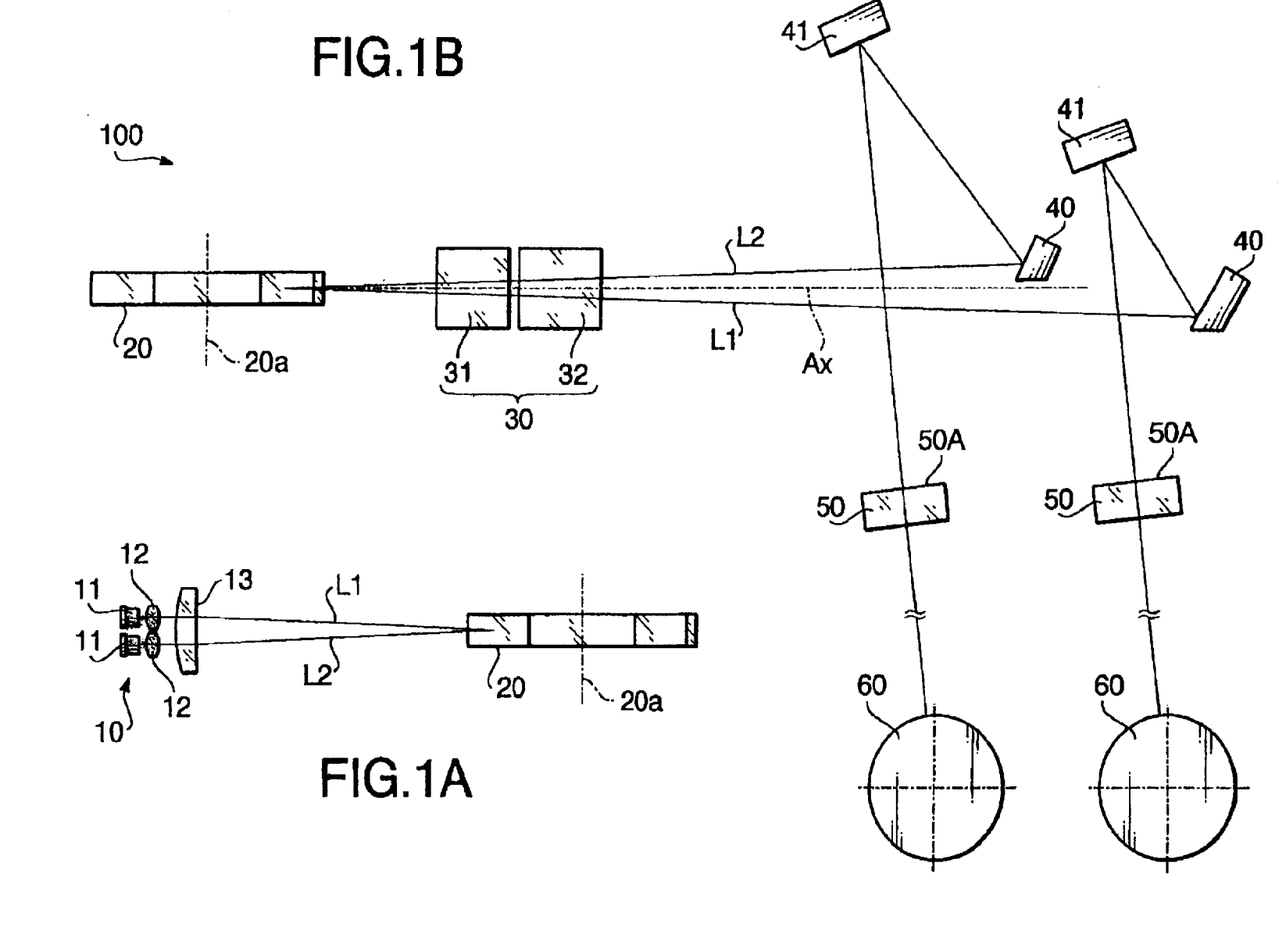
FIG. 1A shows a side view of a light source unit and a polygonal mirror according to embodiments.
FIG. 1B shows a side view of the scanning optical system on a downstream side with respect to the polygonal mirror.

FIG. 1A shows a side view of a light source unit and a polygonal mirror of a so-called tandem scanning optical system to which the present invention is applicable. FIG. 1B shows a side view of the scanning optical system on a photoconductive drum side thereof.

The scanning optical system 100 includes a light source unit 10, which includes two laser diodes 11 and 11, and two collimating lenses 12 and 12 for collimating divergent beams emitted by the laser diodes 11 and 11, respectively. The two beams L1 and L2 respectively collimated by the collimating lenses 12 and 12 are incident on a cylindrical lens 13. The cylindrical lens 13 has a positive power only in the auxiliary scanning direction. Further, the two beams L1 and L2 are deflected, due to a prism effect of the cylindrical lens 13, and incident on substantially the same position on a reflection surface of a polygonal mirror 20. Due to the refraction power of the cylindrical lens 13, a line-like image, which extends in the main scanning direction, is formed on a plane closely adjacent to a reflection surface of the polygonal mirror 20. Therefore, the two beams emitted by the light source unit 10 are incident on the polygonal mirror 20 as being inclined (at a certain incident angle other than zero degree) with respect to a main scanning plane which is defined as a plane that is perpendicular to a rotational axis 20a of the polygonal mirror and includes an optical axis Ax of a scanning lens 30. The two beams intersect with each other substantially on a reflection surface of the polygonal mirror.

The two beams L1 and L2 emitted by the light source unit 10 are simultaneously deflected by the polygonal mirror 20, which rotates about the rotational axis 20a. The deflected beams L1 and L2 proceed in different directions in the auxiliary scanning direction at predetermined angles as shown in FIG. 1B, and enter the scanning lens (i.e., an fθ lens) 30 including a first lens 31 and a second lens 32. Each of the beams emerged from the scanning lens 30 is reflected by a pair of mirrors 40 and 41, and converges on a photoconductive drum 60, through a compensation lens 50, to form a beam spot on the circumferential surface of the photoconductive drum. As the polygonal mirror 20 rotates about the rotational axis 20a, two scanning lines are formed simultaneously on the photoconductive drums 60 and 60, respectively (see FIG. 1B).

The cylindrical lens 13 functions as an anamorphic optical element that converges the beams emitted by the light source unit 10 in the auxiliary scanning direction. The scanning lens 30 and the compensation lens 50 function as an imaging optical system that converges the beams reflected by the polygonal mirror 20 on surfaces 60 to be scanned to form beam spots scanning in the main scanning direction thereon.

A polygonal mirror side surface 50A of each compensation lens 50 is an aspherical surface whose cross-sectional shape in the auxiliary scanning direction is asymmetrical with respect to its optical axis. The aspherical surface 50A is expressed by the following two-dimensional polynomial (1).

$$X(Y, Z) = \frac{(Y^2 + Z^2)C}{1 + \sqrt{1 - (\kappa + 1)(Y^2 + Z^2)C^2}} + \sum B_{mn} Y^m Z^n \quad (1)$$

where, X(Y,Z) represents a SAG amount, which is a distance from a plane tangent to the aspherical surface 50A at its optical axis to a point whose coordinates in the main and auxiliary scanning directions are Y and Z. Further, C is a curvature (1/r: r is a radius) of the aspherical surface 50A on the optical axis, κ is a conical coefficient, $B_{mn}$ are coefficients.

The polynomial (1) is generalized to express a rotationally asymmetrical surface. By assigning values other than zero to at least one of the coefficients $B_{mn}$ whose n is odd, the polynomial (1) expresses an aspherical surface which is asymmetrical with respect to the optical axis.

It is preferable that the aspherical surface expressed by the two-dimensional polynomial (1) further satisfies condition (2) below.

$$0 < \left|\frac{\Delta(dx/dz)}{\beta}\right| < 1.2 \times 10^{-2} \quad (2)$$

where, $\Delta(dx/dz)$ represents a difference between an inclination $(dx/dz)_{ymax}$, in the auxiliary scanning direction, of the aspherical surface at a position where a chief ray of a beam that is incident on the surface to be scanned at a greatest image height (i.e., y=ymax) in the main scanning direction, and an inclination $(dx/dz)_{yo}$, in the auxiliary scanning direction, of the spherical surface at another position where a chief ray of a beam that is incident on the surface to be scanned at the center of the scanning width (i.e., y=yo), and β denotes an incident angle of a beam onto a reflection surface of the polygonal mirror 20 in the auxiliary scanning direction.

Figure 8A:
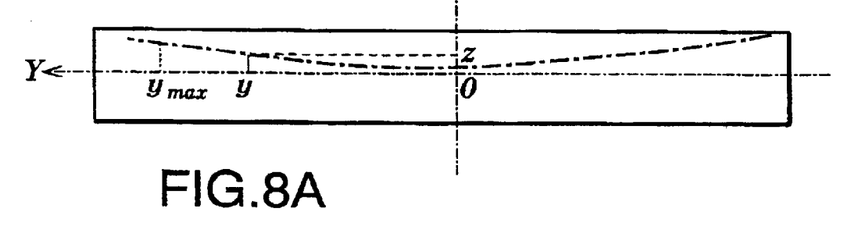
FIGS. 8A–8C are figures illustrating inclination of the aspherical surface of a compensation lens.
Figure 8B:
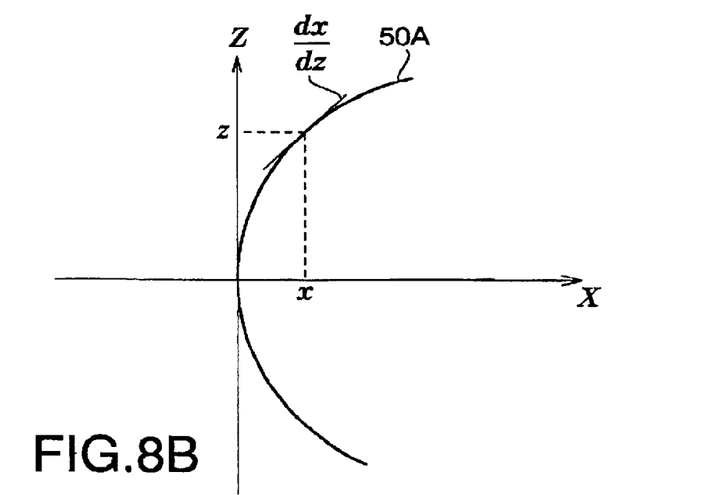
Figure 8C:
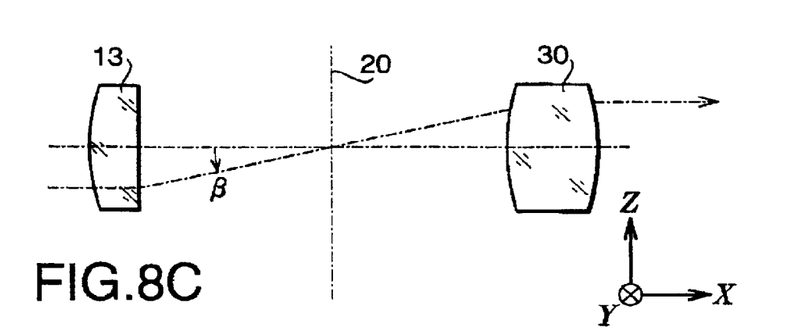

FIGS. 8A–8C illustrate Δdx/dz, $(dx/dz)_{ymax}$, $(dx/dz)_{yo}$ and β. FIG. 8A schematically shows the surface 50A of the compensation lens 50 viewed along the optical axis thereof. The horizontal axis (i.e., Y-axis) represents the main scanning direction, and a locus of a chief ray of a beam incident on the surface 50A is indicated by a dotted line. The vertical axis (i.e., Z-axis) of FIG. 8A represents the auxiliary scanning direction. FIG. 8B is a cross-sectional side view illustrating a relationship between the surface 50A and the inclination dx/dz. In FIG. 8B, the horizontal axis (i.e., X-axis) represents the optical axis, and the vertical axis (i.e., Z-axis) represents the auxiliary scanning direction.

As understood from FIG. 8A, given a point y on Y-axis, a ray height z is determined. Then, as shown in FIG. 8B, a distance x between a plane tangent to the surface 50A at the optical axis and the point where the chief ray is incident is determined. The inclination of the surface 50A at the point designated by z and x with respect to the Z-axis (i.e., with respect to a plane perpendicular to the optical axis in the auxiliary scanning direction) is indicated as dx/dz. Inclination $(dx/dz)_{ymax}$ represents the inclination when y=ymax (see FIG. 8A), and inclination $(dx/dz)_{yo}$ represent the inclination when y=yo. The difference Δ(dx/dz) is calculated as follows.

$$\Delta(dx/dz)=(dx/dz)_{ymax}-(dx/dz)_{yo}$$

FIG. 8C explains a relationship between the incident angle β and the inclination dx/dz. FIG. 8C shows a developed optical path from the cylindrical lens 13 to the scanning lens 30. The polygonal mirror is indicated by a broken line. As understood from FIG. 8C, a sign of the incident angle β is defined such that when the incident angle β is positive, the inclination dx/dz is also positive, while when the incident angle β is negative, the inclination dx/dz is also negative. In other words, given that a beam travels along X-axis in a direction where X-coordinates increases, the incident angle β measured counterclockwise on an X-Z plane about the Y-axis is defined to be positive. Further, the inclination dx/dz of the surface 50A when the incident angle β is positive is defined to be positive. If the incident angle β is negative, the inclination dx/dz is also negative.

By forming the surface 50A to satisfy the condition (2), the bow can be well compensated. If $|\Delta(dx/dz)/\beta|$ does not satisfy the condition (2), compensation is insufficient or superfluous.

Hereinafter, three concrete examples of the tandem scanning optical system shown in FIGS. 1A and 1B will be described. It should be noted that, in the following description of the examples, only the optical system through which beam L2 passes is shown. Further, the optical path of the beam L2 is shown as developed and mirrors 40 and 41 are omitted for the sake of simplicity of the description.

First Embodiment

Figure 2:
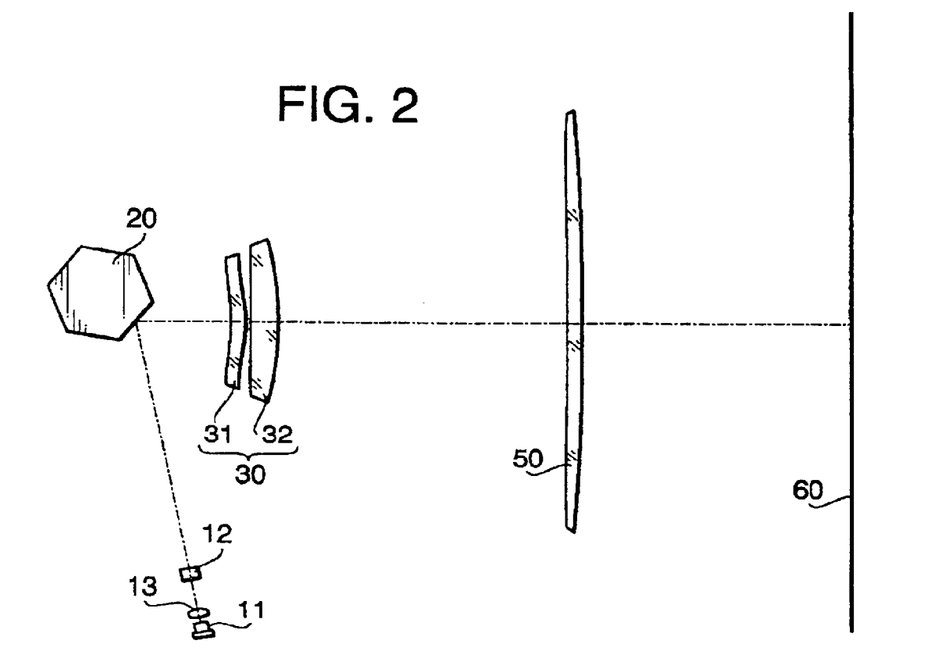
FIG. 2 is a top view of the scanning optical system according to a first embodiment.

FIG. 2 shows an arrangement of optical elements according to a first embodiment on a main scanning plane. TABLE 1 indicates a numerical structure, according to the first embodiment, on the photoconductive drum side from the cylindrical lens 13 of the scanning optical system according to the first embodiment.

In TABLE 1, f denotes a focal length of an imaging optical system in the main scanning direction, Wd denotes a scanning width, λ0 denotes a design wavelength, β denotes an incident angle. The incident angle β is an angle at which a chief ray of each beam from the laser diode forms with respect to the main scanning plane when the beam is incident on the polygonal mirror 20. Further, ry denotes a radius (unit: mm) of curvature in the main scanning direction, and rz denotes a radius (unit: mm) of curvature in the auxiliary scanning direction. If a surface is rotationally symmetrical, no value is indicated for radius rz. Further, d denotes a distance between adjacent surfaces on the optical axis, n denotes a refractive index at a design wavelength of 780 nm, and DECZ denotes a decentering amount (unit: mm) of each surface in the auxiliary scanning direction.

In TABLE 1, surfaces #1 and #2 represent the surfaces of the cylindrical lens 13, surface #3 is a mirror surface of the polygonal mirror 20, surfaces #4 and #5 represent the first lens 31 of the scanning lens 30, surfaces #6 and #7 represent the second lens 32 of the scanning lens 30, surfaces #8 and #9 represent the compensation lens 50, and surface #10 represents the photoconductive drum 60. In the first embodiment, the first lens 31 is a plastic lens, and the second lens 32 is a glass lens.

TABLE 1

| f = 200.0 mm | Wd = 216 mm | λ0 = 780 nm | β = 1.15° | | |
|---|---|---|---|---|---|
| surface | ry | rz | d | n | DECZ |
| #1 | inf. | 51.08 | 4.00 | 1.51072 | 0.00 |
| #2 | inf. | — | 97.00 | | |
| #3 | inf. | — | 33.00 | | |
| #4 | −77.30 | — | 5.00 | 1.48617 | 0.00 |
| #5 | −69.90 | — | 2.00 | | 0.00 |
| #6 | inf. | — | 10.00 | 1.51072 | 0.00 |
| #7 | −131.60 | — | 101.50 | | 0.00 |
| #8 | −849.90 | — | 5.00 | 1.48617 | 2.86 |
| #9 | −1030.00 | — | 96.40 | | 0.00 |
| #10 | inf. | — | | | 0.14 |

Surface #1 is a cylindrical surface having a power only in the auxiliary scanning direction. Surfaces #2, #3 and #6 are planar surfaces. Surfaces #4 and #5 are rotationally symmetrical aspherical surfaces. Surfaces #7 and #9 are spherical surfaces. Surface #8 is an aspherical surface expressed by the two-dimensional polynomial (1).

The rotationally symmetrical aspherical surfaces (i.e., surface #4 and #5) are expressed by following equation.

$$X(h) = \frac{Ch^2}{1 + \sqrt{1 - (1+\kappa)C^2 h^2}} + A_4 h^4 + A_6 h^6 + A_8 h^8$$

In the above equation, X(h) represents a SAG amount which is a distance between a point on the aspherical surface at a height of h and a plane tangential to the aspherical surface at the optical axis. C represents a curvature (1/r) on the optical axis. κ represents a conical coefficient, and $A_4$, $A_6$ and $A_8$ are aspherical coefficients of 4th, 6th and 8th orders, respectively. The radii of curvatures of the rotationally symmetrical aspherical surfaces in TABLE 1 are those on the optical axis. Conical coefficients and aspherical coefficients for the surfaces #4 and #5 are indicated in TABLE 2.

TABLE 2

| Surface | κ | $A_4$ | $A_6$ | $A_8$ |
|---|---|---|---|---|
| #4 | 0.00 | 7.450 × 10$^{-6}$ | −4.110 × 10$^{-11}$ | 0.00 |
| #5 | 0.00 | 6.250 × 10$^{-6}$ | −8.480 × 10$^{-10}$ | 0.00 |

Values of the coefficients Bmn for surface #8 are indicated in TABLE 3. For certain combinations of the values of m and n, all values of Bmn equal to zero, which are eliminated from the table.

TABLE 3

| $B_{mn}$ | n = 0 | n = 1 | n = 2 |
|---|---|---|---|
| m = 0 | — | 3.370 × 10$^{-02}$ | 1.682 × 10$^{-02}$ |
| m = 2 | 0.000 | −7.540 × 10$^{-07}$ | −5.030 × 10$^{-07}$ |
| m = 4 | 1.270 × 10$^{-07}$ | −3.600 × 10$^{-11}$ | 1.150 × 10$^{-11}$ |
| m = 6 | −1.190 × 10$^{-11}$ | 0.000 | 0.000 |
| m = 8 | 7.430 × 10$^{-16}$ | 0.000 | 0.000 |

| $B_{mn}$ | n = 4 | n = 6 |
|---|---|---|
| m = 0 | 4.480 × 10$^{-05}$ | 1.190 × 10$^{-09}$ |
| m = 2 | −1.910 × 10$^{-10}$ | 0.000 |
| m = 4 | 0.000 | 0.000 |
| m = 6 | 0.000 | 0.000 |
| m = 8 | 0.000 | 0.000 |

Figure 3A:
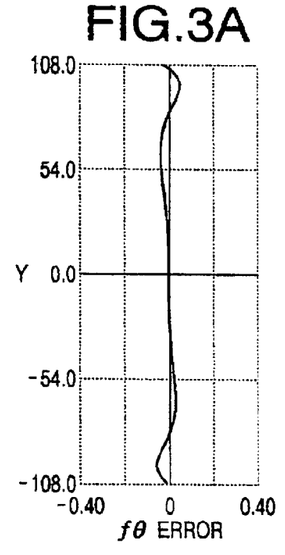
FIG. 3A is a graph showing an fθ error characteristic according to the first embodiment.
Figure 3B:
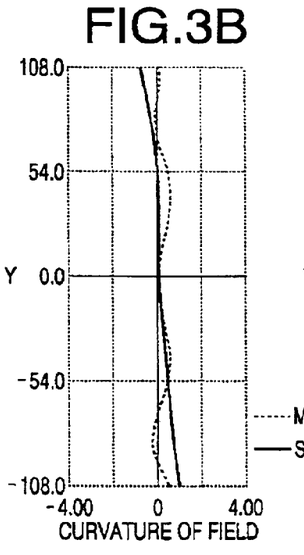
FIG. 3B is a graph showing a curvature of field according to the first embodiment.
Figure 3C:
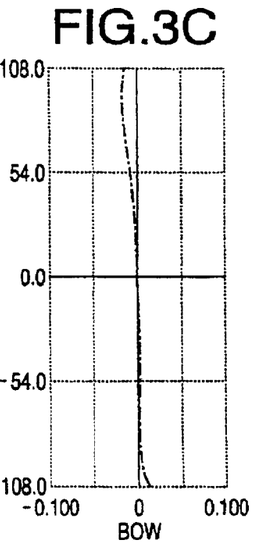
FIG. 3C is a graph showing a bow characteristic according to the first embodiment.

FIG. 3A is a graph showing an fθ error characteristic (i.e., displacement of a beam spot with respect to a designed position) according to a first embodiment. FIG. 3B is the graph showing a curvature of field according to the first embodiment. In FIG. 3B, a broken line (M) shows the characteristic in the main scanning direction, and a solid line (S) shows the characteristic in the auxiliary scanning direction. FIG. 3C is a graph showing a bow characteristic (i.e., displacement of a beam spot in the auxiliary scanning direction with respect to a designed main scanning line) according to the first embodiment. In each graph, the longitudinal axis represents an image height (unit: mm), and the horizontal axis represents an amount of aberration (unit: mm). As understood from FIG. 3C, by employing the aspherical surface expressed by the polynomial (1), the bow is well compensated for.

According to the first embodiment, $(dx/dz)_{ymax}$=0.02517, $(dx/dz)_{yo}$=0.02045, and $|\Delta(dx/dz)/\beta|$=4.10×10$^{-3}$.

Thus, condition (2) is satisfied.

Second Embodiment

Figure 4:
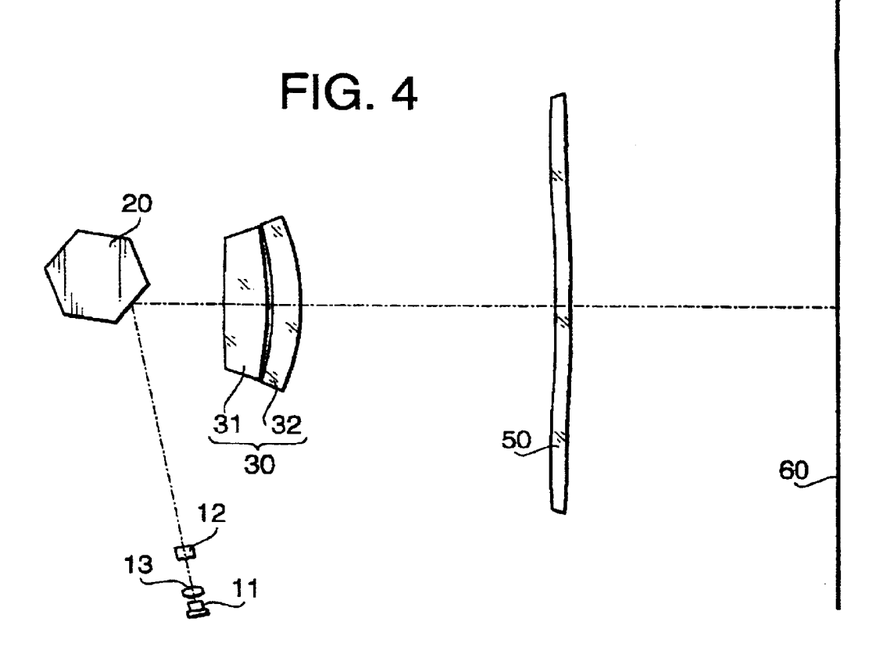
FIG. 4 is a top view of the scanning optical system according to a second embodiment.

FIG. 4 shows an arrangement of optical elements according to the second embodiment. TABLE 4 indicates a numerical structure of the second embodiment on the photoconductive drum side from the cylindrical lens 13 of the scanning optical system according to the second embodiment. In the second embodiment, the first and second lenses 31 and 32 of the scanning lens 30 are plastic lenses.

TABLE 4 f = 200.0 mm   Wd = 216 mm   λ0 = 780 nm   β = 1.15°

| surface | ry | rz | d | n | DECZ |
|---|---|---|---|---|---|
| #1 | inf. | 51.08 | 4.00 | 1.51072 | 0.00 |
| #2 | inf. | — | 97.00 | | |
| #3 | inf. | — | 33.00 | | |
| #4 | inf. | — | 15.00 | 1.48617 | 0.00 |
| #5 | −124.60 | — | 2.00 | | 0.00 |
| #6 | −104.80 | — | 10.00 | 1.48617 | 0.00 |
| #7 | −80.20 | — | 92.50 | | 0.00 |
| #8 | −522.80 | — | 5.00 | 1.48617 | 2.43 |
| #9 | −1888.00 | — | 97.30 | | 0.00 |
| #10 | inf. | — | | | 0.40 |

Surface #1 is a cylindrical surface having a power only in the auxiliary scanning direction. Surfaces #2 and #3 are planar surfaces. Surfaces #4 through #7 are rotationally symmetrical aspherical surfaces. Surface #8 is an aspherical surface expressed by the polynomial (1). Surface #9 is a spherical surface.

Conical coefficients and aspherical coefficients for the surfaces #4 through #7 are indicated in TABLE 5, and coefficients $B_{mn}$ for surface #8 are indicated in TABLE 6. For certain combinations of the values of m and n, all values of Bmn equal to zero, which are eliminated from TABLE 6.

TABLE 5

| Surface | κ | $A_4$ | $A_6$ | $A_8$ |
|---|---|---|---|---|
| #4 | 0.00 | 1.955 × 10$^{-6}$ | 1.565 × 10$^{-11}$ | 0.00 |
| #5 | 0.00 | 1.185 × 10$^{-6}$ | 5.312 × 10$^{-10}$ | 7.87 × 10$^{-14}$ |
| #6 | 0.00 | 8.887 × 10$^{-7}$ | 0.00 | 0.00 |
| #7 | 0.00 | 1.032 × 10$^{-6}$ | 0.00 | 0.00 |

TABLE 6

| $B_{mn}$ | n = 0 | n = 1 | n = 2 |
|---|---|---|---|
| m = 0 | — | 2.235 × 10$^{-02}$ | 1.720 × 10$^{-02}$ |
| m = 2 | 0.000 | −2.543 × 10$^{-07}$ | −4.637 × 10$^{-07}$ |
| m = 4 | 1.687 × 10$^{-07}$ | −3.814 × 10$^{-11}$ | 6.546 × 10$^{-12}$ |
| m = 6 | −1.031 × 10$^{-11}$ | 0.000 | 0.000 |
| m = 8 | 3.509 × 10$^{-16}$ | 0.000 | 0.000 |

| $B_{mn}$ | n = 4 | n = 6 |
|---|---|---|
| m = 0 | 3.814 × 10$^{-06}$ | −9.063 × 10$^{-09}$ |
| m = 2 | −1.987 × 10$^{-10}$ | 0.000 |
| m = 4 | 0.000 | 0.000 |
| m = 6 | 0.000 | 0.000 |
| m = 8 | 0.000 | 0.000 |

Figure 5A:
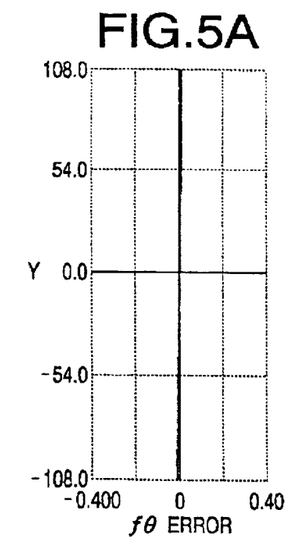
FIG. 5A is a graph showing an fθ error characteristic according to the second embodiment.
Figure 5B:
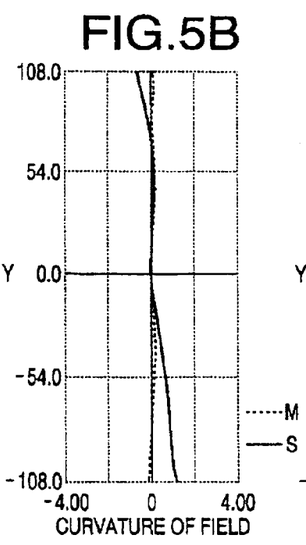
FIG. 5B is a graph showing a curvature of field according to the second embodiment.
Figure 5C:
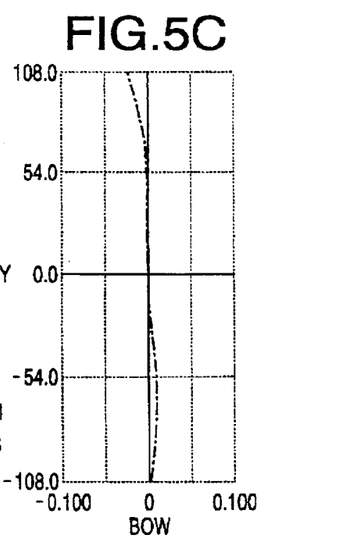
FIG. 5C Is a graph showing a bow characteristic according to the second embodiment.

FIG. 5A is a graph showing an fθ error characteristic according to a second embodiment. FIG. 5B is a graph showing a curvature of field according to the second embodiment. In FIG. 5B, a broken line (M) shows the characteristic in the main scanning direction, and a solid line (S) shows the characteristic in the auxiliary scanning direction. FIG. 5C is a graph showing a bow characteristic according to the second embodiment. In each graph, the longitudinal axis represents an image height (unit: mm), and the horizontal axis represents an amount of aberration (unit: mm). As understood from FIG. 5C, by employing the aspherical surface expressed by the polynomial (1), the bow is well compensated for in the second embodiment.

According to the second embodiment, $(dx/dz)_{Ymax}=0.02632$, $(dx/dz)_{yo}=0.02074$, and $|\Delta(dx/dz)/\beta|=4.85\times10^{-3}$.

Thus, condition (2) is satisfied.

Third Embodiment

Figure 6:
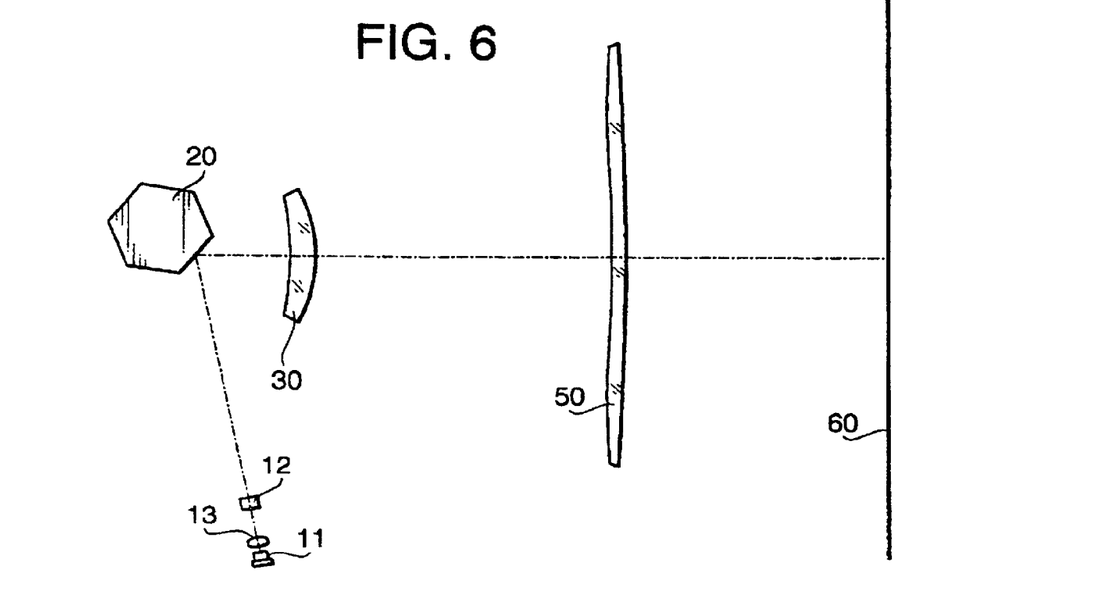
FIG. 6 is a top view of the scanning optical system according to a third embodiment.

FIG. 6 shows an arrangement of optical elements according to the third embodiment. TABLE 7 indicates a numerical structure of the third embodiment on the photoconductive drum side from the cylindrical lens 13 of the scanning optical system according to the third embodiment. In the third embodiment, the scanning lens 30 is a single plastic lens. Accordingly, in TABLE 7, surfaces #4 and #5 represent the scanning lens 30, surfaces #6 and #7 represent a compensation lens 50, and surface #8 represents the photoconductive drum 60.

TABLE 7 f = 200.0 mm    Wd = 216 mm    λ0 = 780 nm    β = 1.15°

| surface | ry | rz | d | n | DECZ |
|---|---|---|---|---|---|
| #1 | inf. | 51.08 | 4.00 | 1.51072 | 0.00 |
| #2 | inf. | — | 97.00 | | |
| #3 | inf. | — | 33.00 | | |
| #4 | −109.20 | — | 9.00 | 1.48617 | 0.00 |
| #5 | −51.60 | — | 104.50 | | 0.00 |
| #6 | −590.20 | — | 5.00 | 1.48617 | 1.33 |
| #7 | −1310.40 | — | 93.00 | | 0.00 |
| #8 | inf. | — | | | 0.40 |

Surface #1 is a cylindrical surface having a power only in the auxiliary scanning direction. Surfaces #2 and #3 are planar surfaces. Surfaces #4 and #5 are rotationally symmetrical aspherical surfaces. Surface #6 is an aspherical surface expressed by polynomial (1). Surface #7 is a spherical surface.

Conical coefficients and aspherical coefficients for the surfaces #4 and #5 are indicated in TABLE 8, and coefficients $B_{mn}$ for surface #6 are indicated in TABLE 9. For certain combinations of the values of m and n, all values of Bmn equal to zero, which are eliminated from TABLE 9.

TABLE 8

| Surface | κ | $A_4$ | $A_6$ | $A_8$ |
|---|---|---|---|---|
| #4 | 0.00 | $1.891 \times 10^{-8}$ | $5.845 \times 10^{-10}$ | $-8.937 \times 10^{-14}$ |
| #5 | 0.00 | $1.610 \times 10^{-6}$ | $8.377 \times 10^{-10}$ | $3.979 \times 10^{-13}$ |

TABLE 9

| $B_{mn}$ | n = 0 | n = 1 | n = 2 |
|---|---|---|---|
| m = 0 | — | $1.510 \times 10^{-02}$ | $1.773 \times 10^{-02}$ |
| m = 2 | 0.000 | $-1.757 \times 10^{-07}$ | $-5.357 \times 10^{-07}$ |
| m = 4 | $1.638 \times 10^{-07}$ | $-3.608 \times 10^{-11}$ | $9.117 \times 10^{-12}$ |
| m = 6 | $-9.472 \times 10^{-12}$ | 0.000 | 0.000 |
| m = 8 | $2.751 \times 10^{-16}$ | 0.000 | 0.000 |

| $B_{mn}$ | n = 4 | n = 6 |
|---|---|---|
| m = 0 | $3.821 \times 10^{-06}$ | $-9.063 \times 10^{-09}$ |
| m = 2 | $-2.014 \times 10^{-10}$ | 0.000 |
| m = 4 | 0.000 | 0.000 |
| m = 6 | 0.000 | 0.000 |
| m = 8 | 0.000 | 0.000 |

Figure 7A:
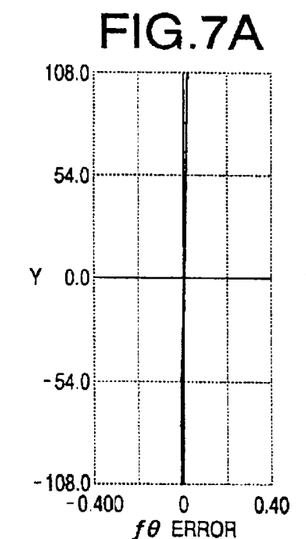
FIG. 7A is a graph showing an fθ error characteristic according to the third embodiment.
Figure 7B:
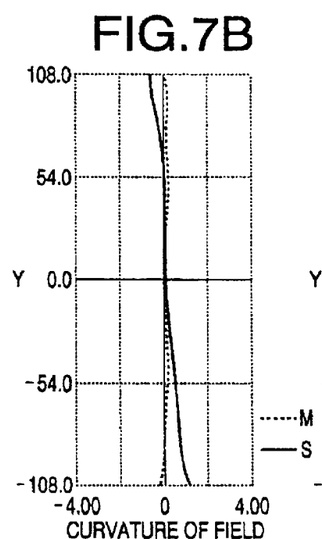
FIG. 7B is a graph showing a curvature of field according to the third embodiment.
Figure 7C:
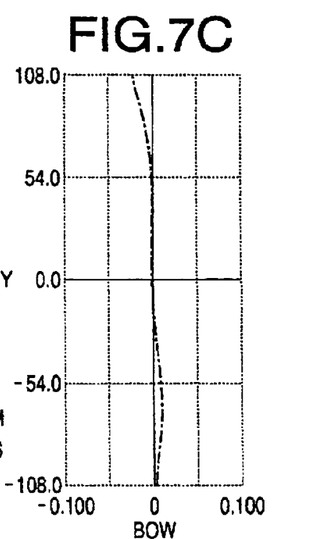
FIG. 7C is a graph showing a bow characteristic according to the third embodiment.

FIG. 7A is a graph showing an fθ error characteristic according to the third embodiment. FIG. 7B is a graph showing a curvature of field according to the third embodiment. In FIG. 7B, a broken line (M) shows the characteristic in the main scanning direction, and a solid line (S) shows the characteristic in the auxiliary scanning direction. FIG. 7C is a graph showing a bow characteristic according to the third embodiment. In each graph, the longitudinal axis represents an image height (unit: mm), and the horizontal axis represents an amount of aberration (unit: mm). As understood from FIG. 7C, by employing the aspherical surface which is expressed by the polynomial (1), the bow is well compensated for in the third embodiment.

According to the third embodiment, $(dx/dz)_{ymax}=0.02489$, $(dx/dz)_{yo}=0.01881$, and $|\Delta(dx/dz)/\beta|=5.29\times10^{-3}$.

Thus, condition (2) is satisfied.

As described above, by employing an aspherical surface defined by the two-dimensional polynomial (1), the power in the auxiliary scanning direction can be designed independently from the power distribution in the main scanning direction. Accordingly, even when the incident angle of each of the beams incident on the polygonal mirror has a certain value other than zero degrees, the bow can be well compensated for.

Further, the aspherical surface expressed by the two-dimensional polynomial (1) can be designed to compensate for aberrations. Therefore, even if all surfaces of the scanning lens are configured to be rotationally symmetrical surfaces, the bow can be compensated sufficiently. Thus, the manufacturing process of the scanning lens can be simplified, thereby reducing the manufacturing cost.

Furthermore, by configuring the compensation lenses to satisfy condition (2), the bow can be well suppressed.

In the above-described embodiments, only two beams are used. However, the invention is not limited to the configuration described above, and can be modified without departing from the gist of the invention. For example, the number of the beams simultaneously scanned on the surface to be scanned can be three or more. By configuring the optical system such that all the beams intersect substantially on a reflection surface of the polygonal mirror, the thickness (in the rotational axial direction) can remain relatively small. When the thickness of the polygonal mirror is relatively small, torque required for a driving motor that rotate the polygonal mirror can be reduced, and noise generated by the driving motor can be suppressed.

The present disclosure relates to the subject matter contained in Japanese Patent Application No. 2001-141404, filed on May 11, 2001, which is expressly incorporated herein by reference in its entirety.

What is claimed is:

1. A scanning optical system for emitting at least one beam scanning in a main scanning direction, comprising:

a light source that emits at least one beam;

an anamorphic optical element that converges the at least one beam emitted by said light source in an auxiliary scanning direction which is perpendicular to the main scanning direction;

a polygonal mirror that rotates and deflects the at least one beam emerged from said anamorphic optical element to scan in the main scanning direction;

an imaging optical system that converges the at least one beam deflected by said polygonal mirror to form at least one beam spot on a surface to be scanned, said at least one beam spot scanning in the main scanning direction on the surface to be scanned, wherein said imaging optical system has:

a scanning lens; and a compensation lens provided on the surface side with respect to said scanning lens, said compensation lens compensating for curvature of field, wherein all surfaces of said scanning lens are rotationally symmetrical, and wherein said compensation lens has at least one aspherical surface, a cross section of said aspherical surface in the auxiliary scanning direction being asymmetrical with respect to the optical axis thereof, a SAG amount defining said at least one surface being expressed by a two-dimensional polynomial.

2. The scanning optical system according to claim 1, wherein said scanning lens consists of a first lens element and a second lens element.

3. The scanning optical system according to claim 2, wherein said first lens element is a plastic lens and said second lens element is a glass lens.

4. The scanning optical system according to claim 2, wherein both said first lens element and said second lens element are plastic lenses.

5. The scanning optical system according to claim 1, wherein said scanning lens consists of a single lens element.

6. The scanning optical system according to claim 1, wherein said aspherical surface satisfies condition:

$$0 < \left|\frac{\Delta(dx/dz)}{\beta}\right| < 1.2 \times 10^{-2}$$

wherein, $\Delta(dx/dz)$ represents a difference between an inclination, in the auxiliary scanning direction, of the aspherical surface at a position where a chief ray of a beam that is incident on the surface to be scanned at a greatest image height in the main scanning direction, and an inclination, in the auxiliary scanning direction, of the spherical surface at another position where a chief ray of a beam that is incident on the surface to be scanned at the center of the scanning width, and wherein $\beta$ denotes an incident angle of a beam onto a reflection surface of the polygonal mirror in the auxiliary scanning direction.

7. A laser beam printer employing a scanning optical system for emitting at least one beam scanning in a main scanning direction, said scanning optical system comprising:

a light source that emits at least one beam;

an anamorphic optical element that converges the at least one beam emitted by said light source in an auxiliary scanning direction which is perpendicular to the main scanning direction;

a polygonal mirror that rotates and deflects the at least one beam emerged from said anamorphic optical element to scan in the main scanning direction;

an imaging optical system that converges the at least one beam deflected by said polygonal mirror to form at least one beam spot on a surface to be scanned, said at least one beam spot scanning in the main scanning direction on the surface to be scanned, wherein said imaging optical system has:

a scanning lens; and a compensation lens provided on the surface side with respect to said scanning lens, said compensation lens compensating for curvature of field, wherein all surfaces of said scanning lens are rotationally symmetrical, and wherein said compensation lens has at least one aspherical surface, a cross section of said aspherical surface in the auxiliary scanning direction being asymmetrical with respect to the optical axis thereof, a SAG amount defining said at least one surface being expressed by a two-dimensional polynomial.

8. The laser beam printer according to claim 7, wherein said scanning lens consists of a first lens element and a second lens element.

9. The laser beam printer according to claim 8, wherein said first lens element is a plastic lens and said second lens element is a glass lens.

10. The laser beam printer according to claim 8, wherein both said first lens element and said second lens element are plastic lenses.

11. The laser beam printer according to claim 7, wherein said scanning lens consists of a single lens element.

12. The laser beam printer according to claim 7, wherein said aspherical surface satisfies condition:

$$0 < \left|\frac{\Delta(dx/dz)}{\beta}\right| < 1.2 \times 10^{-2}$$

wherein, $\Delta(dx/dz)$ represents a difference between an inclination, in the auxiliary scanning direction, of the aspherical surface at a position where a chief ray of a beam that is incident on the surface to be scanned at a greatest image height in the main scanning direction, and an inclination, in the auxiliary scanning direction, of the spherical surface at another position where a chief ray of a beam that is incident on the surface to be scanned at the center of the scanning width, and wherein $\beta$ denotes an incident angle of a beam onto a reflection surface of the polygonal mirror in the auxiliary scanning direction.

* * * * *